United States Patent
Troyanovsky et al.

(10) Patent No.: US 10,127,034 B1
(45) Date of Patent: Nov. 13, 2018

(54) SYSTEM, METHOD, AND COMPUTER PROGRAM FOR DELAYED EVALUATION OF CONDITION BASED TREES

(71) Applicant: Amdocs Software Systems Limited, Dublin (IE)

(72) Inventors: Alexander Troyanovsky, Gan-Yavne (IL); Yevgeny Chechelnitsky, Netanya (IL); Igor Troyanovsky, Beer Sheva (IL)

(73) Assignees: AMDOCS DEVELOPMENT LIMITED, Limassol (CY); AMDOCS SOFTWARE SYSTEMS LIMITED, Dublin (IE)

( * ) Notice: Subject to any disclaimer, the term of this patent is extended or adjusted under 35 U.S.C. 154(b) by 463 days.

(21) Appl. No.: 14/864,727

(22) Filed: Sep. 24, 2015

(51) Int. Cl.
   *G06F 8/65* (2018.01)
   *G06F 8/658* (2018.01)

(52) U.S. Cl.
   CPC ............ *G06F 8/658* (2018.02); *G06F 8/65* (2013.01)

(58) Field of Classification Search
   CPC . G06F 8/61; G06F 17/248; G06F 8/65; G06F 8/68; G06F 8/60; G06F 8/658; G06F 8/70
   USPC ................................................ 717/168, 170
   See application file for complete search history.

(56) References Cited

U.S. PATENT DOCUMENTS

| | | | | |
|---|---|---|---|---|
| 7,480,856 B2* | 1/2009 | Jones | ................. | G06F 17/3092 |
| | | | | 707/E17.126 |
| 8,949,814 B2* | 2/2015 | Green | ................. | G06Q 10/04 |
| | | | | 717/168 |
| 9,417,865 B2* | 8/2016 | Vidal | ................. | G06F 8/65 |
| 9,720,675 B2* | 8/2017 | Lain | ................. | G06F 8/65 |
| 2001/0015832 A1* | 8/2001 | Suzuki | ................. | H04N 5/2352 |
| | | | | 358/475 |
| 2002/0010910 A1* | 1/2002 | Crudele | ................. | G06F 8/61 |
| | | | | 717/128 |
| 2010/0115506 A1* | 5/2010 | Ljungbjorn | ................. | G06F 8/61 |
| | | | | 717/174 |
| 2011/0296398 A1* | 12/2011 | Vidal | ................. | G06F 8/65 |
| | | | | 717/171 |
| 2012/0109914 A1* | 5/2012 | Lain | ................. | G06F 8/65 |
| | | | | 707/695 |

(Continued)

*Primary Examiner* — Marina Lee
(74) *Attorney, Agent, or Firm* — Zilka-Kotab, P.C.

(57) ABSTRACT

A system, method, and computer program product are provided for delayed evaluation of condition based trees. In use, an update to perform on a software product is identified. Additionally, update material is generated to utilize for updating the software product. Further, first information associated with the update material that is able to be evaluated is evaluated in a first evaluation phase. In addition, second information associated with the update material that requires delayed evaluation is identified. The second information that requires delayed evaluation is preserved in a human readable format. Furthermore, parameters required for evaluating the second information that requires delayed evaluation are received. Still yet, the second information that requires delayed evaluation utilizing the received parameters is evaluated in a second evaluation phase. Moreover, a final evaluation result is generated utilizing a result of the first evaluation phase and the second evaluation phase for updating the software product.

20 Claims, 12 Drawing Sheets

(56) References Cited

U.S. PATENT DOCUMENTS

| | | | |
|---|---|---|---|
| 2012/0236759 A1* | 9/2012 | Huang | H04W 8/24 370/256 |
| 2014/0196020 A1* | 7/2014 | Shetty | G06F 8/65 717/171 |
| 2015/0295759 A1* | 10/2015 | Mollersten | H04L 41/0843 709/222 |
| 2016/0019206 A1* | 1/2016 | Mysur | G06Q 10/06 707/825 |

* cited by examiner

SYSTEM, METHOD, AND COMPUTER PROGRAM FOR DELAYED EVALUATION OF CONDITION BASED TREES

FIELD OF THE INVENTION

The present invention relates to software package updates, and more particularly to more efficiently and reliably applying such updates.

BACKGROUND

In the context of applying updates to software packages, there is a build phase, an evaluation phase, and a deployment phase. The evaluation phase includes evaluating condition based trees including information and parameters associated with the updates that are to be applied.

During the evaluation of the condition based trees, in some cases, some of the leaf parameters of the trees may not be populated with data or may contain unreliable information (e.g. pending user input), which might influence the tree structure (e.g. if there are conditions that refer those unpopulated parameters, etc.).

There is thus a need for addressing these and/or other issues associated with the prior art.

SUMMARY

A system, method, and computer program product are provided for delayed evaluation of condition based trees. In use, an update to perform on a software product is identified. Additionally, update material is generated to utilize for updating the software product. Further, first information associated with the update material that is able to be evaluated is evaluated in a first evaluation phase. In addition, second information associated with the update material that requires delayed evaluation is identified. The second information that requires delayed evaluation is preserved in a human readable format. Furthermore, parameters required for evaluating the second information that requires delayed evaluation are received. Still yet, the second information that requires delayed evaluation utilizing the received parameters is evaluated in a second evaluation phase. Moreover, a final evaluation result is generated utilizing a result of the first evaluation phase and the second evaluation phase for updating the software product.

DETAILED DESCRIPTION

Figure 1:
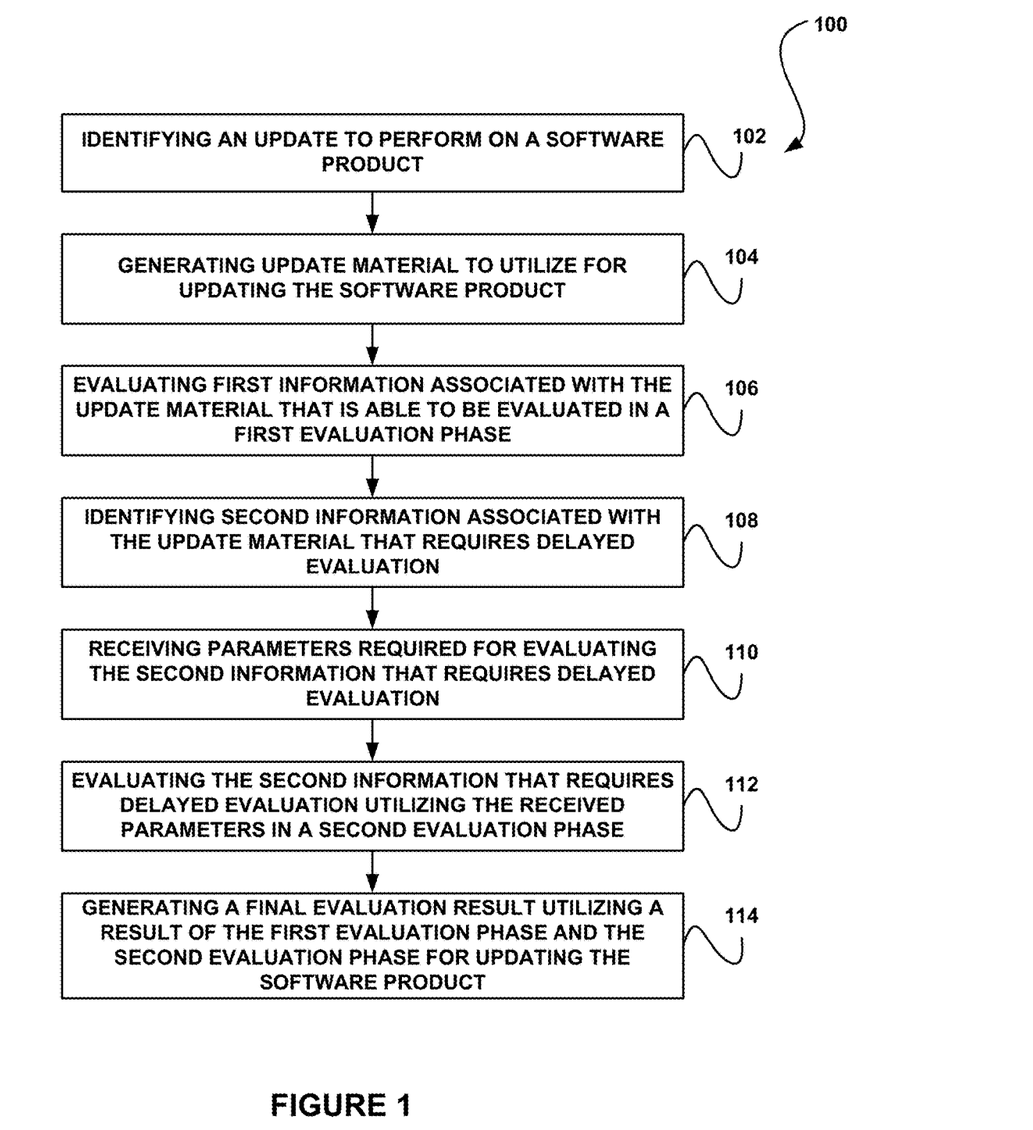
FIG. 1 illustrates a method for delayed evaluation of condition based trees, in accordance with one embodiment.

FIG. 1 illustrates a method 100 for delayed evaluation of condition based trees, in accordance with one embodiment.

As shown, an update to perform on a software product is identified. See operation 102. The software product may include any software application, portion of a software application, computer code, and/or various software packages. The software product may be associated with various industries, such as the telecommunication industry, etc.

Additionally, update material is generated to utilize for updating the software product. See operation 104. The update material may include any material for updating the software product, such as file and computer code, etc. The update material may be generated in, and/or stored in, a format or structure associated with a condition-based tree. A condition-based evaluation tree is a tree that defines dependencies between parameters, where nodes represent parameters and vertexes represent reference to another parameter.

In one embodiment, the update material may include a generated software update kit. In this case, the generated software update kit may include one or more templatized files that represent an end state of the software product.

Further, first information associated with the update material that is able to be evaluated is evaluated in a first evaluation phase. See operation 106. For example, all information stored in the condition-based tree format that is capable of being evaluated utilizing data existing in the condition-based tree format may be evaluated.

In addition, second information associated with the update material that requires delayed evaluation is identified. See operation 108. This may include identifying all information stored in the condition-based tree format that is not capable of being evaluated utilizing data existing in the condition-based tree format. For example, the information may not be able to be evaluated because parameters required for evaluation are missing and/or because at least some data required for evaluation is unreliable, etc.

In one embodiment, the second information that requires delayed evaluation may be preserved and/or stored in a human readable format. In this case, preserving the information in the human readable format may include converting the second information from a computer readable format to the human readable format. The stored second information in the human readable format may be capable of being edited/supplemented by a user.

Furthermore, parameters required for evaluating the second information that requires delayed evaluation are received. See operation 110. For example, a user may provide missing parameters or information required for evaluating the second information. A user may also correct information/data that needs correcting for evaluating the second information.

In one embodiment, the user may be notified via a user interface, etc. of the second information that requires delayed evaluation. For example, data corresponding to the identified second information associated with the update material that requires delayed evaluation may be presented to a user. This may include, for example, presenting the data in a file or presenting the data in a data tree format, etc.

Still yet, the second information that requires delayed evaluation utilizing the received parameters is evaluated in a second evaluation phase. See operation 112.

Moreover, a final evaluation result is generated utilizing a result of the first evaluation phase and the second evaluation phase for updating the software product. See operation 114.

Thus, all the information of the updated material (which may be a condition-based tree structure) that can be evaluated will be, and all the information that is required for delayed/postponed evaluation (once all the required parameters are supplied) will be preserved in textual/human readable format, allowing the users to review, understand, and modify the information prior to postponed evaluation which will generate the final result.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
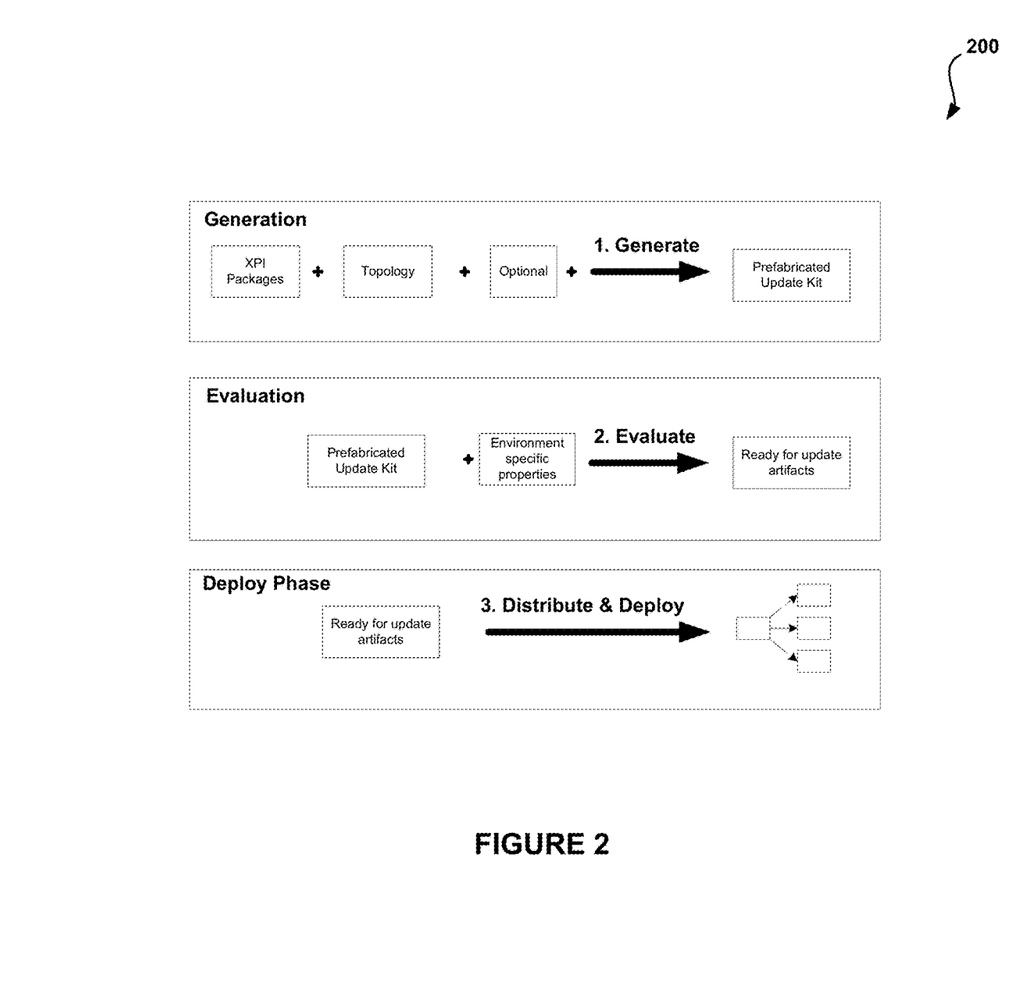
FIG. 2 illustrates a flow diagram for delayed evaluation of condition based trees, in accordance with one embodiment.

FIG. 2 illustrates a flow diagram 200 for delayed evaluation of condition based trees, in accordance with one embodiment. As an option, the flow diagram 200 may be implemented in the context of the details of FIG. 1. Of course, however, the flow diagram 200 may be implemented in the context of any desired environment. Further, the aforementioned definitions may equally apply to the description below.

The diagram 200 illustrates a procedure that will allow updating of installed software environments. The algorithm used in the procedure relies on a two phase procedure. For a first phase of the algorithm, the required update material is generated during a build phase. For a second phase of the algorithm, the update materials are applied on the target environment.

The procedure described in the context of FIG. 2 is environment agnostic, such that update material is generated once and can be used on multiple environments.

Additionally, the procedure is development and operations (DevOps) oriented, bringing value already in the development phase by allowing the developer to understand and analyze the implications of every modification.

The solution is based on an algorithm in graph theory that is referred to herein as a "condition based evaluation tree" algorithm. This algorithm deals with a problem that occurs when, during generation phase, environment specific information is missing, and during evaluation phase the environment model is missing.

Figure 3:
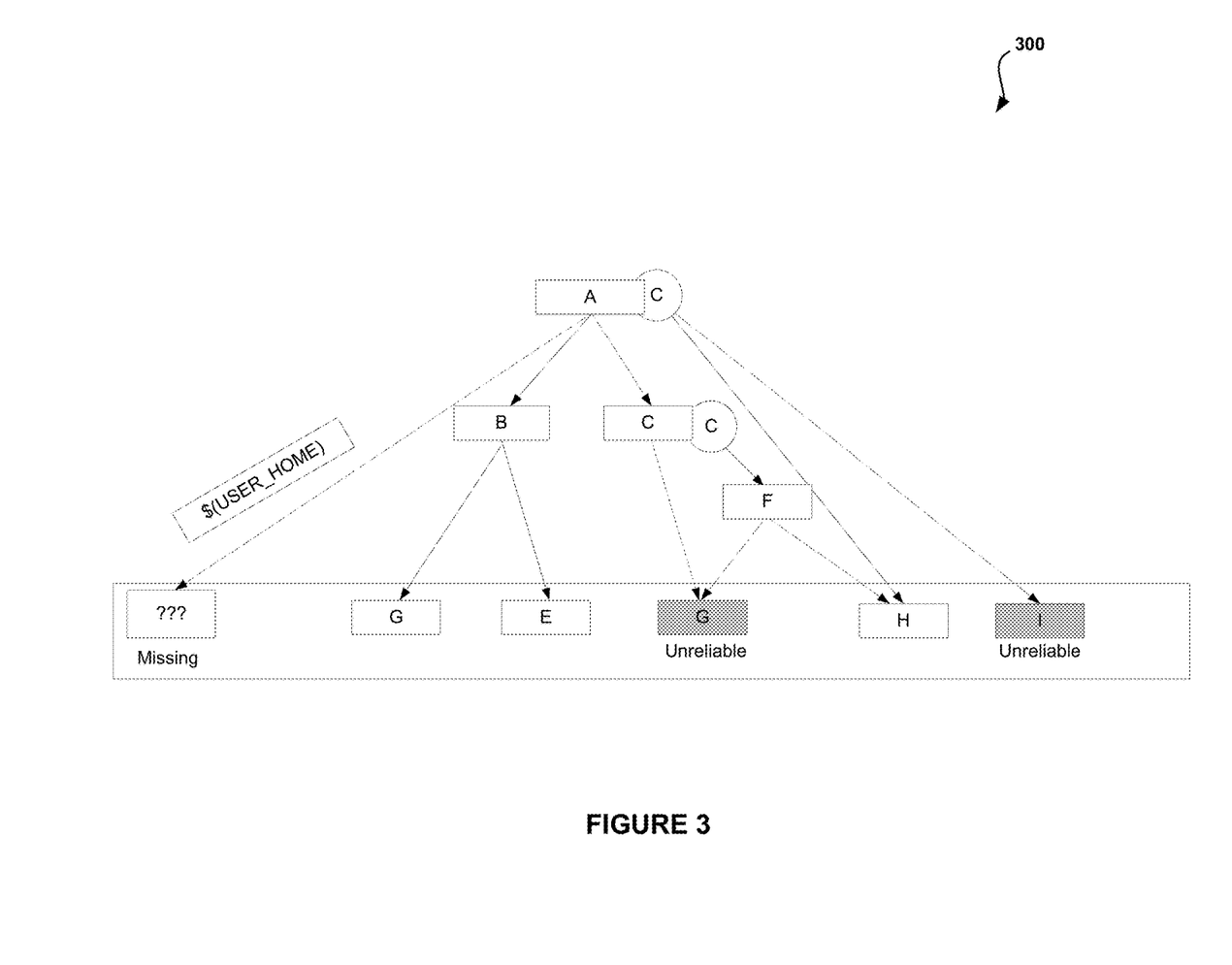
FIG. 3 illustrates a diagram of a condition based tree, in accordance with one embodiment.

FIG. 3 illustrates a diagram 300 of a condition based tree, in accordance with one embodiment. As an option, the diagram 300 may be implemented in the context of the details of the previous figures. Of course, however, the diagram 300 may be implemented in the context of any desired environment. Further, the aforementioned definitions may equally apply to the description below.

The condition based evaluation tree is a tree that defines dependencies between parameters, where nodes represent parameters and vertexes represent references to another parameter, either by Existence Condition, direct value reference, or an elaborate value expression (e.g. which may include functions, 'if' conditions, etc.).

A certain parameter can be evaluated if all of its children can be evaluated or have reliable, deterministic value. In a conditioned tree, a node's existence might be questionable (conditioned), when the condition itself is an expression referencing another parameter (or set of parameters) in the same tree. The parameter name is not unique in the tree, but can be uniquely identified by its path. As an example, as shown in FIG. 3, there are two occurrences of parameter G: A/B/G, A/C/G.

Evaluation of such tree is defined by having the ability to determine the final value of the root of this tree. The task of evaluation is straight forward when all leaf parameters are populated with values and ready for examination/evaluation and the dependencies between parameters are well defined.

By describing the three major limitations of this tree it is possible to define the problem. For example, some of the leaf parameters may not be populated with data or contain unreliable information, which, besides final value evaluation failure, might influence the tree structure itself (e.g. if there are conditions that refer to those unpopulated/unreliable parameters, etc.).

Additionally, evaluation has to be greedy, meaning that the algorithm must evaluate and calculate as much as it can, due to the fact that resolvable information might not be available once the evaluation is finished. Further, the well-defined hierarchy, grouping, structure and referencing between parameters is a known fact during generation (e.g. Topology data model), but will not be available after generation is finished.

In order to solve these problems, the mechanism of delayed evaluation may be utilized. Based on this mechanism, all the information that can be evaluated will be, and all the information that is required for delayed/postponed evaluation (once all the required parameters are supplied) will be preserved in textual/human readable format, allowing the users to review, understand, and modify the information prior to postponed evaluation (Phase II) which will generate the final result.

Figure 4:
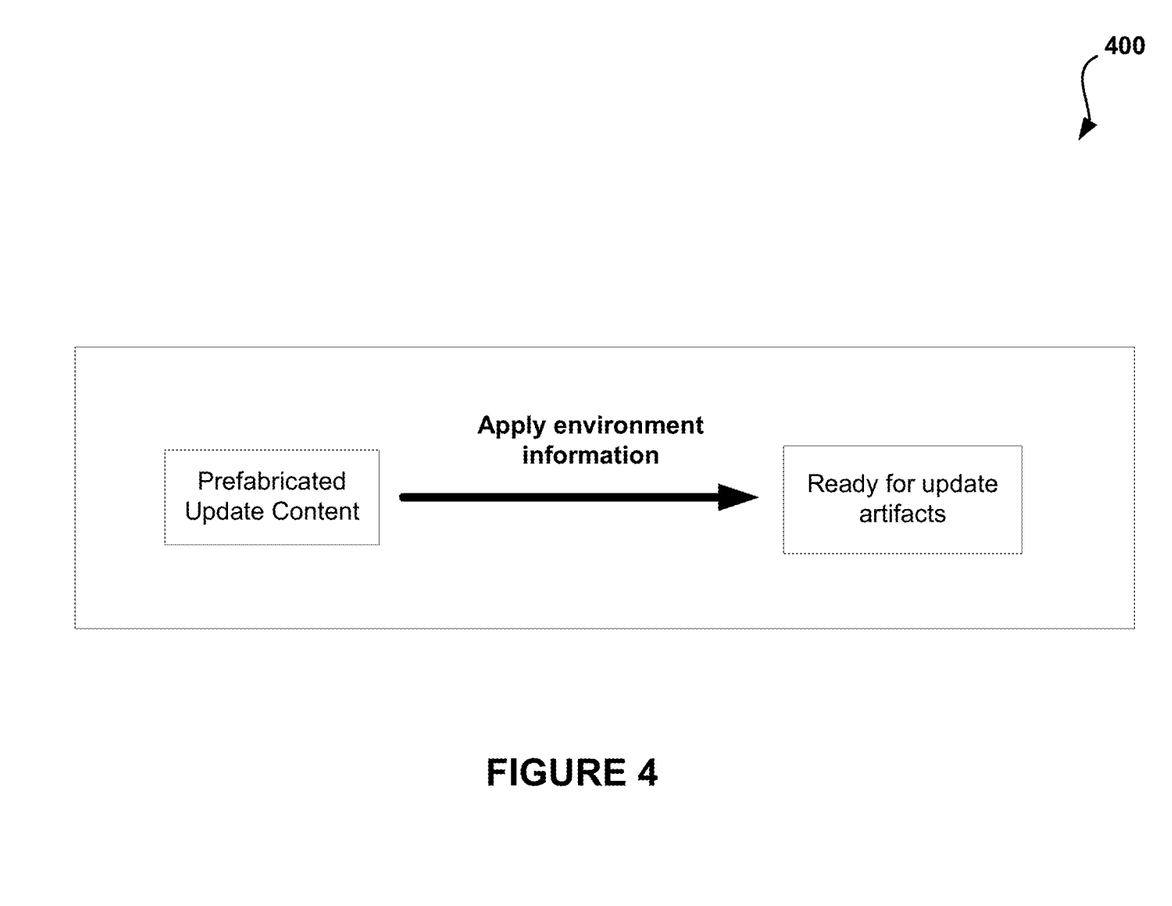
FIG. 4 illustrates a simplified diagram of an incremental update/delayed evaluation solution, in accordance with one embodiment.

FIG. 4 illustrates a simplified diagram 400 of an incremental update/delayed evaluation solution, in accordance with one embodiment. As an option, the diagram 400 may be implemented in the context of the details of the previous figures. Of course, however, the diagram 400 may be implemented in the context of any desired environment. Further, the aforementioned definitions may equally apply to the description below.

In operation, during a build phase, all the required content for the environment update will be prepared. Update content creation does not require environment installation. Additionally, update content is generated in a human readable format allowing review and editing prior to the execution. Further, the update content will not contain environment specific information, making the content applicable on any environment of the same type.

During build phase, update content can be created as a "prefabricated" set of scripts and data due to the fact that environment information is missing in this phase. The final assembly of update materials can be done by applying the environment specific information on the prefabricated content.

Figure 5:
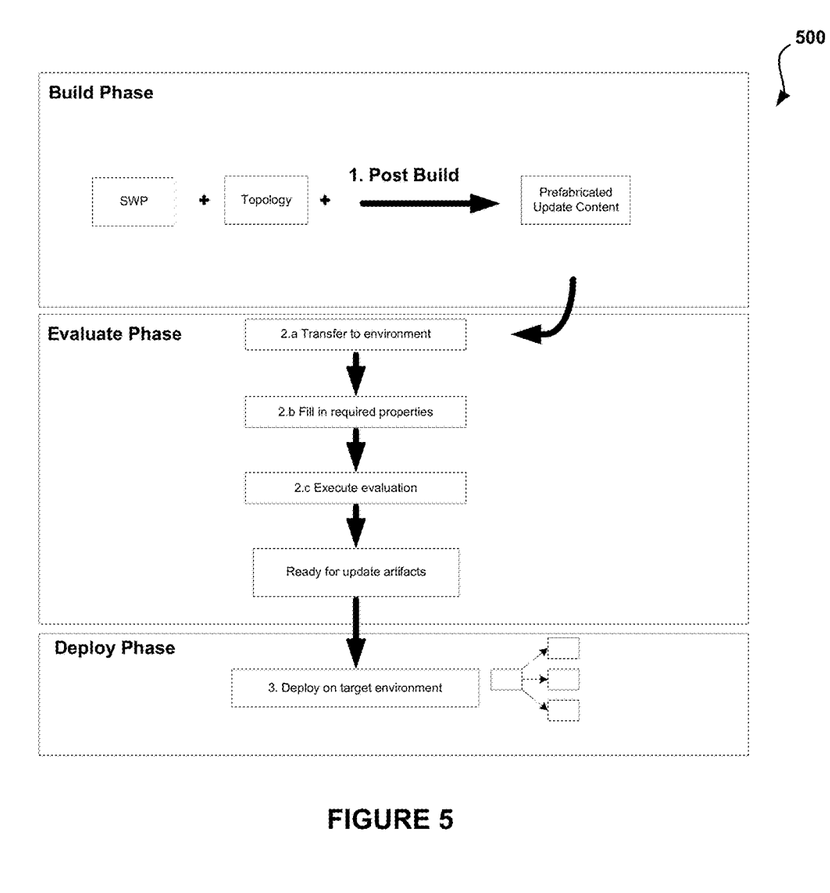
FIG. 5 illustrates a diagram showing the incremental update/delayed evaluation solution, in accordance with one embodiment.

FIG. 5 illustrates a diagram 500 showing the incremental update/delayed evaluation solution, in accordance with one embodiment. As an option, the diagram 500 may be implemented in the context of the details of the previous figures.

Of course, however, the diagram 500 may be implemented in the context of any desired environment. Further, the aforementioned definitions may equally apply to the description below.

In the post build phase, when the software package has been already created and topologies have been expended, for each environment type, the "Delayed Evaluation Content" is generated by comparing it to the previous release. During the evaluate phase, the user will have to transfer the "Delayed Evaluation Content" to the target environment, fill in or supply the property file and execute the delayed evaluation that will create environment specific, evaluated, ready for update content.

During the deploy phase, the user will have to apply the generated files on the target environment. For that purpose, an XPI implementation will supply automatic deployment scripts.

Figure 6:
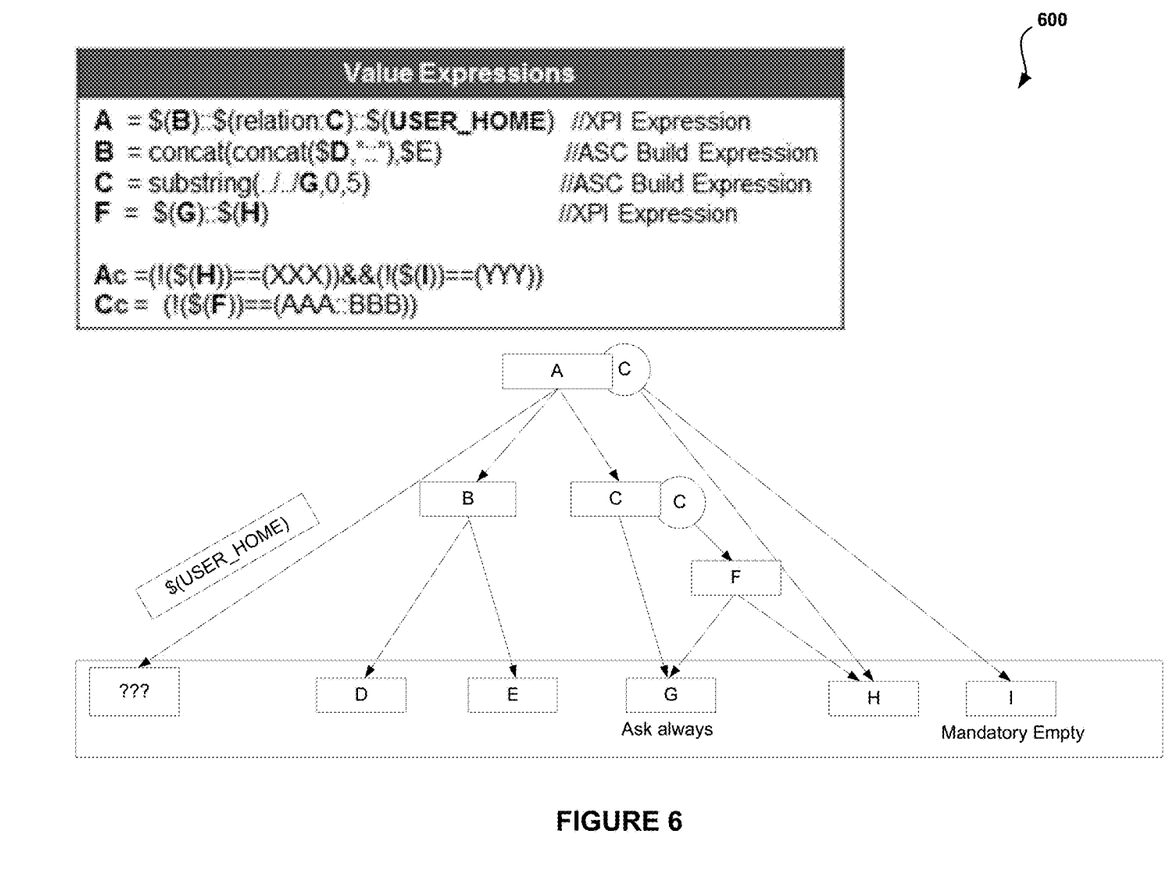
FIG. 6 illustrates an example of an incremental update/delayed evaluation implementation, in accordance with one embodiment.

FIG. 6 illustrates an example 600 of an incremental update/delayed evaluation implementation, in accordance with one embodiment. As an option, the example 600 may be implemented in the context of the details of the previous figures. Of course, however, the example 600 may be implemented in the context of any desired environment. Further, the aforementioned definitions may equally apply to the description below.

As shown in FIG. 6, parameter A is an only parameter of property file XXX.properties. Its value and existence evaluation can be visualized using the tree data model shown in FIG. 6, where nodes represent parameters in the dependency tree and vertexes represent parameter references. A node can be attached with a condition (represented by C) that by itself can refer to another parameter.

To be able to evaluate this tree, all the leaves have to be populated. As stated before, during build phase, all the required leaf information may not be present (environment variables, empty mandatory parameters, etc.) or it may be unreliable.

In XPI, an "Ask Always" parameter is a good example of an unreliable piece of information due to the fact that its value has a high potential to be entered or replaced by the user during installation either through wizard steps or through a silent installation property file. The same applies for empty mandatory parameters.

Figure 7:
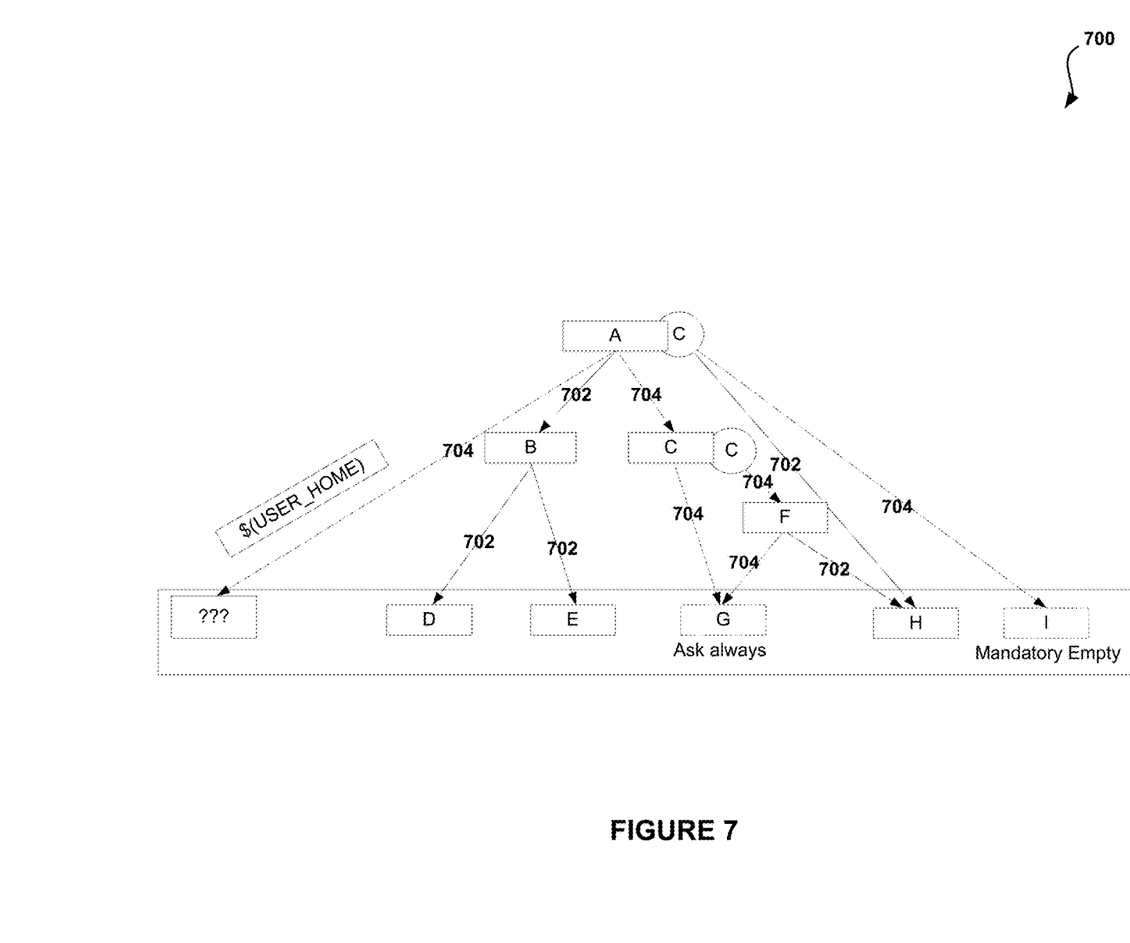
FIG. 7 illustrates an example of an incremental update/delayed evaluation implementation, in accordance with one embodiment.

As shown in FIG. 7, all the passes within this tree can be classified into two types: a green path 702 that can be finally evaluated during build phase; and a red path 704 that cannot be finally evaluated during build phase due to partial or unreliable information.

Based on this example, "Delayed Evaluation Content" will be configured such that each property is uniquely identified by its path within the topology, where green paths are evaluated during build, and the red paths' hierarchy and conditions are preserved.

Figure 8:
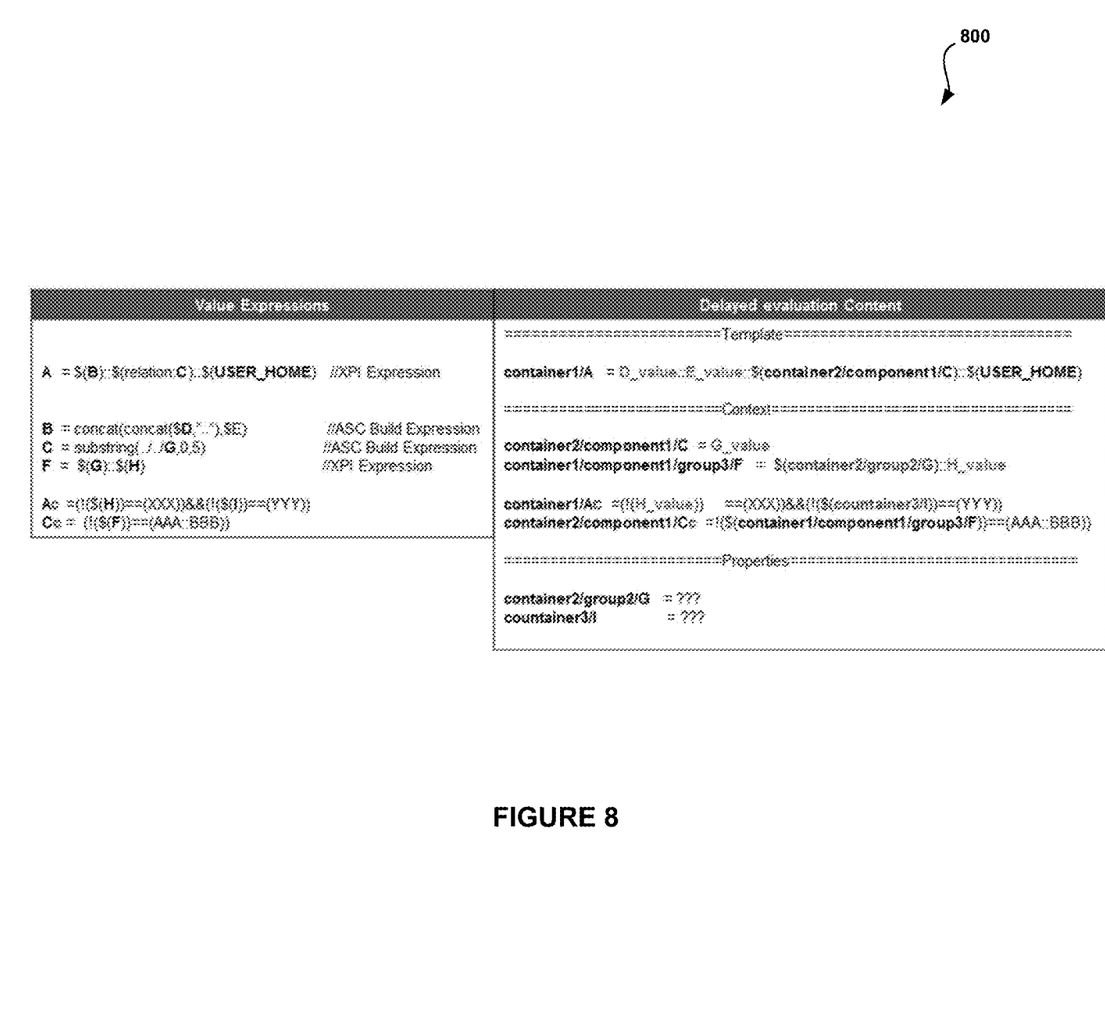
FIG. 8 shows a delayed evaluation content result for the example illustrated in FIG. 7, in accordance with one embodiment.

FIG. 8 shows a Delayed Evaluation Content result 800 for the example illustrated in FIG. 7, in accordance with one embodiment.

Based on the example shown in FIG. 7, Delayed Evaluation Content will appear as shown in FIG. 8. In this case, each property is uniquely identified by its path within the topology. Green paths are evaluated during build. Red path's hierarchy and conditions are preserved in the context.

The output of evaluation may preserve the topology hierarchy using a folder hierarchy. The context and properties are common to the entire update content. Additionally, files may be configured as templates. Each file may be accompanied with a deployment descriptor to preserve target information, etc.

During evaluation, in order to be able to resolve all properties, the tree has to be rebuilt in memory, be populated with leaf values, and have conditions and values evaluated.

Since nodes of the tree are uniquely identified, if a hash map referenced tree is used, O(n) performance to rebuild the tree may be achieved from a flat textual representation to an in-memory tree based representation, with both conditions and value evaluation using DFS traversal 2*O(n)=O(n).

Figure 9:
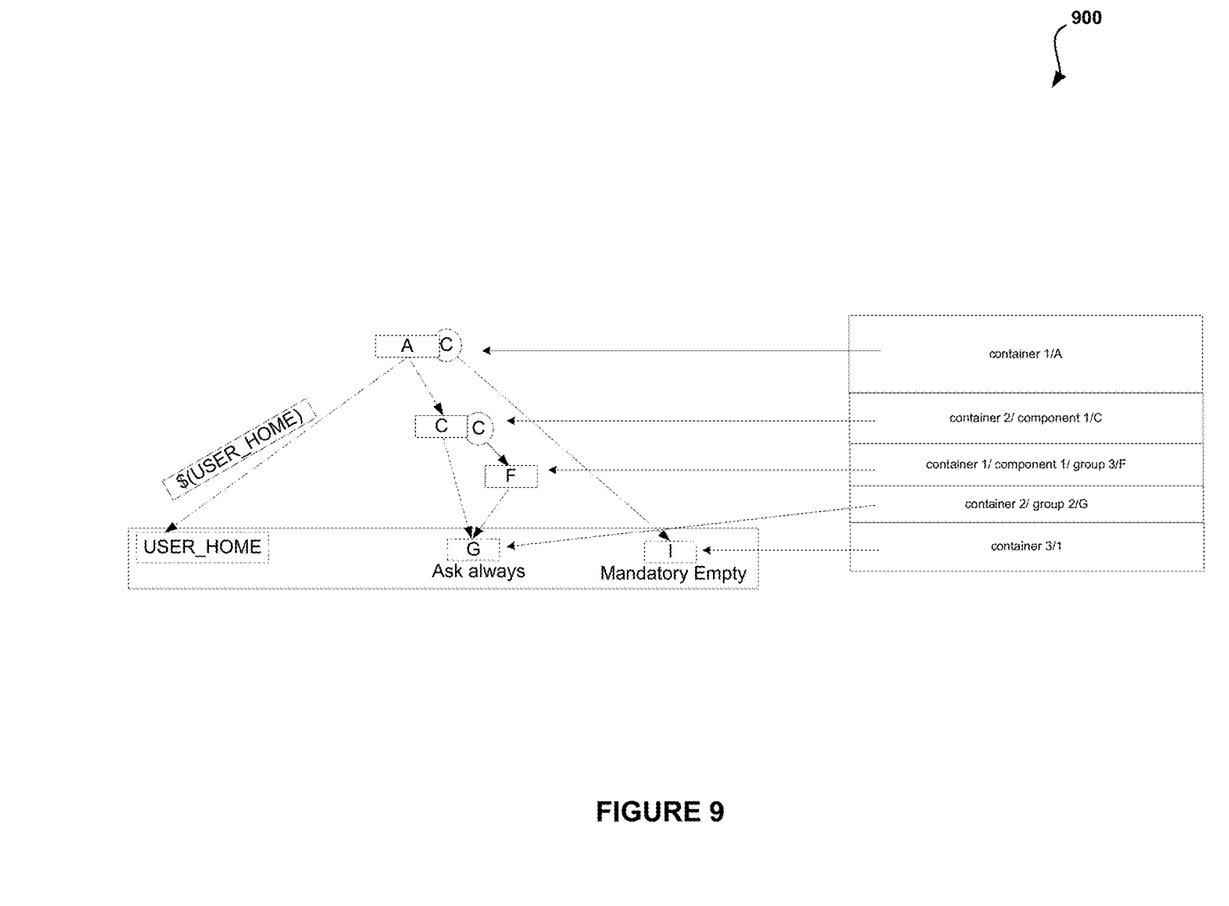
FIG. 9 illustrates an example of an incremental update/delayed evaluation implementation, in accordance with one embodiment.

FIG. 9 illustrates an example 900 of an incremental update/delayed evaluation implementation showing nodes and container associations, in accordance with one embodiment.

Figure 10:
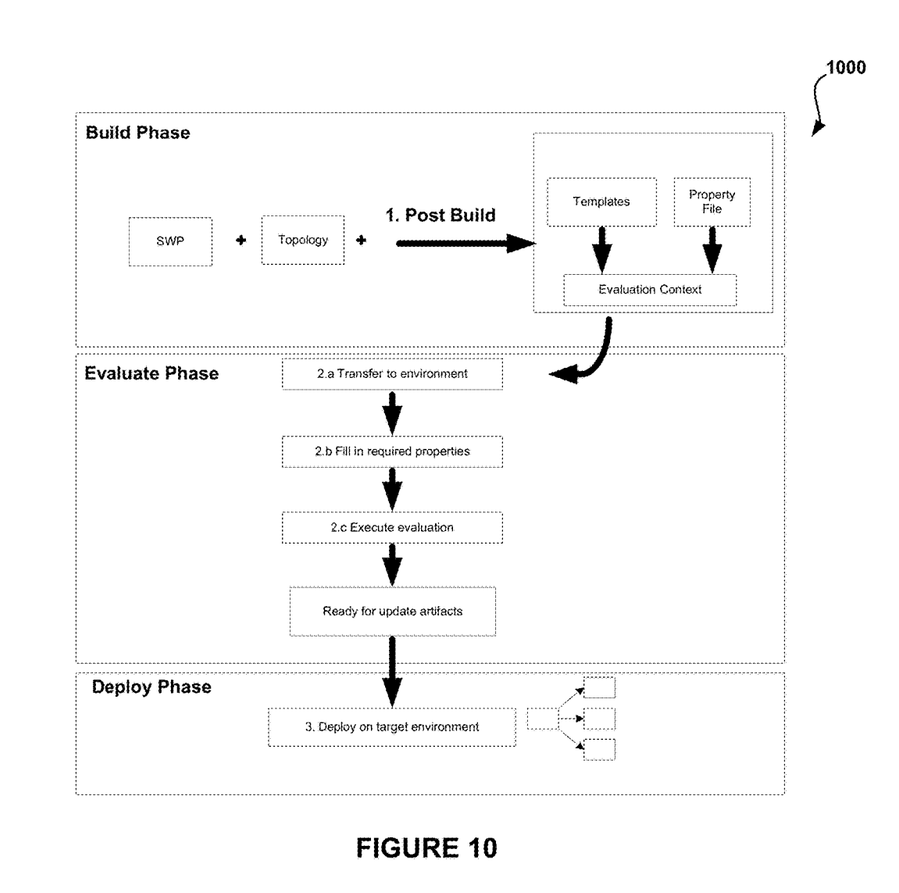
FIG. 10 illustrates a diagram showing the incremental update/delayed evaluation solution, in accordance with one embodiment.

FIG. 10 illustrates a diagram 1000 showing the incremental update/delayed evaluation solution, in accordance with one embodiment. As an option, the diagram 1000 may be implemented in the context of the details of the previous figures. Of course, however, the diagram 1000 may be implemented in the context of any desired environment. Further, the aforementioned definitions may equally apply to the description below.

In operation, all the required content for the environment update will be prepared in post build phase. No environment is required. Update content creation does not require environment installation. Update content is generated in human readable format allowing a user to review and edit prior to the execution (e.g. using editable scripts and SQL files instead of XPI black box execution, etc.). The update content will not contain environment specific information, making the content applicable on any environment of the same type.

All executable code is created at build time, not at install time, removing complexity from the installation. Further, all environment specific configuration is separated from the EARs and other build artifacts. The build of the software product is completely separated from its installation (which is environment specific).

As an example, during build phase, an XPI topology may not be entirely evaluated due to the lack of environment specific configuration. Thus, XPI core has to provide a mechanism for "Delayed Evaluation" that will: identify the changes during build; and evaluate what is possible during the build phase and leave the entire environment specific dependent configuration for "Delayed Evaluation"—evaluation on target environment. This implementation will support a variety of application configuration files, such as simple property files, template based files, external ASC, and custom configuration files, etc. Further, such techniques may be implemented in the context of a variety of deployment methods, such as file system deployment, database deployment, and custom deployment, etc.

During the generation phase, the user will be to generate the "Update Kit", which may be a set of template files that represent the "END STATE" of the current software package.

The input used during the generation phase may include XPI packages, and a template topology representing environment type. If there are several types of topologies such as, UAT, PET, Production etc., this procedure will be executed separately for each topology type. The input used during the generation phase may also include a property file that supplies an entire property set (including environment specific properties) in order to be able to skip the evaluation phase and already during generation phase to create the evaluated information ready for the update kit. The input may also include an optional parameter useful in secured environments to be able to handle encrypted values.

The output of the generation phase will be "Delayed Evaluation Content" for each topology container. The Delayed Evaluation Content may be composed of various parts, such as template files, evaluation context, and property files.

Template Files include partially evaluated configuration files. Configuration entries that were not entirely evaluated will contain expressions instead of values. That expression does not have to be identical to the expressions that appear on the topology, because during evaluation attempt the expression may be minimized (partially evaluated).

Evaluation Context is the topology/metadata information that is required for delayed evaluation. Since during "Delayed evaluation execution" the topology is not loaded, this context contains all the required topology/metadata based information crucial for delayed evaluation execution.

The reason evaluation is partial during build phase is because environment specific information is not available. The property file will hold the minimal set of properties required to complete evaluation on the target environment. This is actually a way to guide the user through and help him figure out what is essential for process completion.

In cases where there are no new configuration entries since the last installation, the user may choose to supply a property file that was supplied during installation.

During the evaluation phase the user will have to transfer the "Delayed Evaluation Content" to the target environment, fill in or supply the property file and execute the delayed evaluation that will create environment specific, evaluated, ready for update configuration files. XPI core may supply a utility for delayed evaluation execution.

During the deploy phase the user will have to apply the generated files on the target environment.

Figure 11:
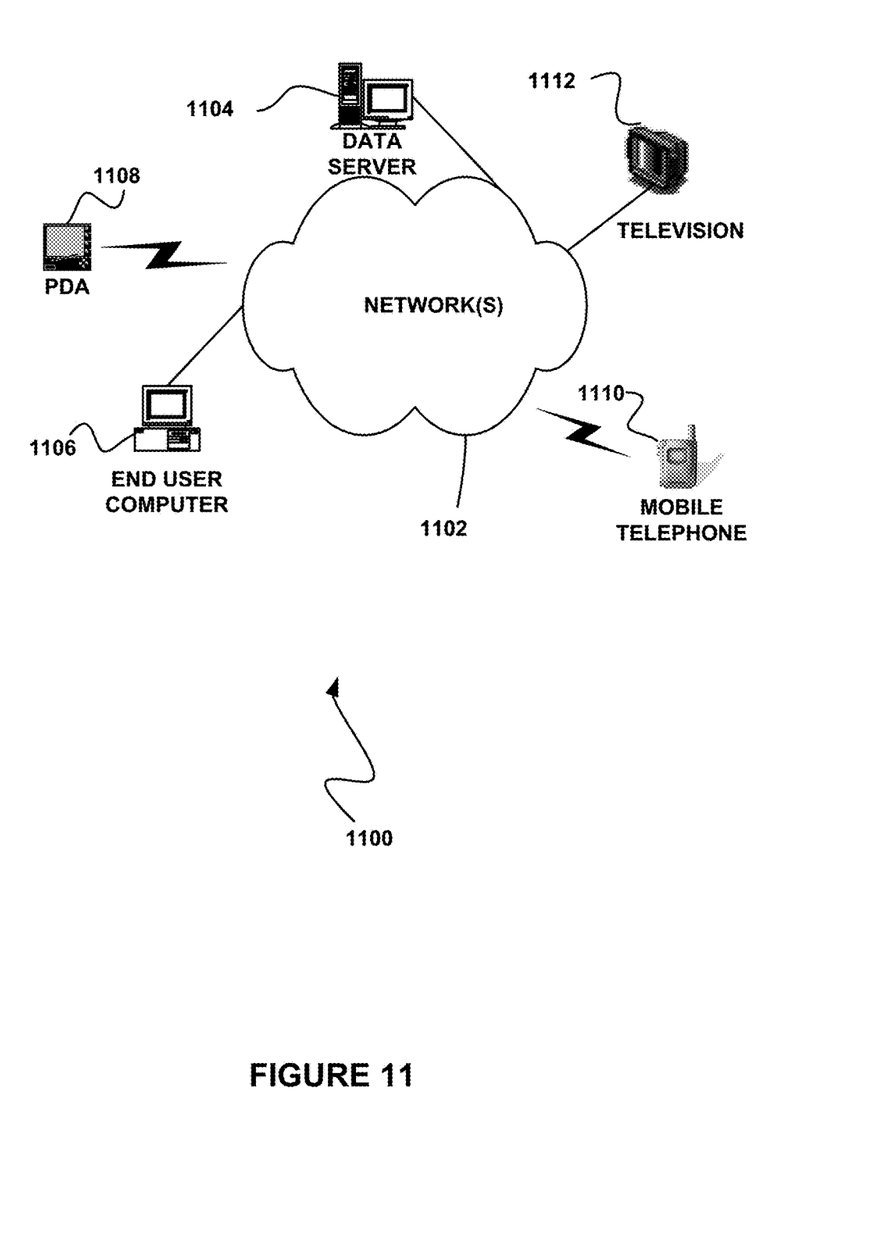
FIG. 11 illustrates a network architecture, in accordance with one possible embodiment.

FIG. 11 illustrates a network architecture 1100, in accordance with one possible embodiment. As shown, at least one network 1102 is provided. In the context of the present network architecture 1100, the network 1102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1102 may be provided.

Coupled to the network 1102 is a plurality of devices. For example, a server computer 1104 and an end user computer 1106 may be coupled to the network 1102 for communication purposes. Such end user computer 1106 may include a desktop computer, lap-top computer, and/or any other type of logic. Still yet, various other devices may be coupled to the network 1102 including a personal digital assistant (PDA) device 1108, a mobile phone device 1110, a television 1112, etc.

Figure 12:
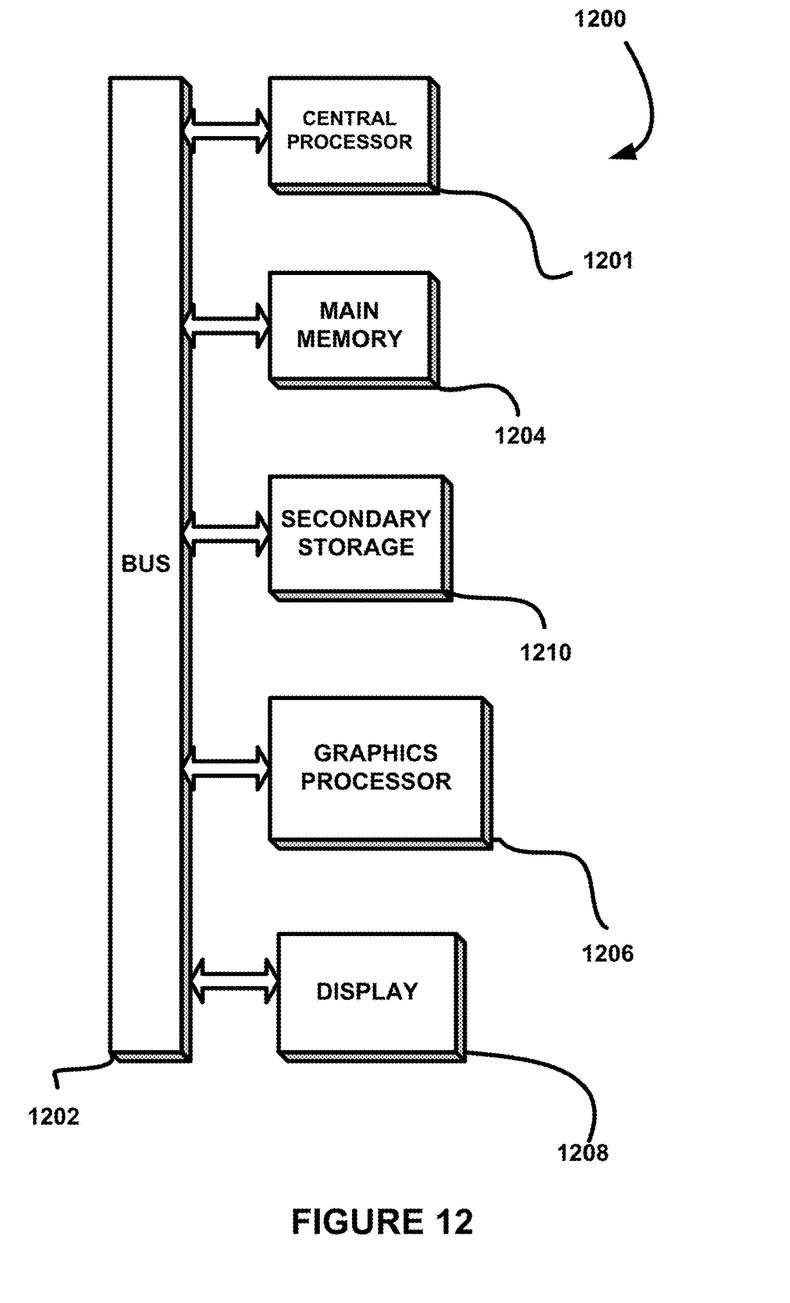
FIG. 12 illustrates an exemplary system, in accordance with one embodiment.

FIG. 12 illustrates an exemplary system 1200, in accordance with one embodiment. As an option, the system 1200 may be implemented in the context of any of the devices of the network architecture 1100 of FIG. 11. Of course, the system 1200 may be implemented in any desired environment.

As shown, a system 1200 is provided including at least one central processor 1201 which is connected to a communication bus 1202. The system 1200 also includes main memory 1204 [e.g. random access memory (RAM), etc.]. The system 1200 also includes a graphics processor 1206 and a display 1208.

The system 1200 may also include a secondary storage 1210. The secondary storage 1210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 1204, the secondary storage 1210, and/or any other memory, for that matter. Such computer programs, when executed, enable the system 1200 to perform various functions (as set forth above, for example). Memory 1204, storage 1210 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising computer code for:
   identifying an update to perform on a software product;
   generating a condition-based tree to utilize for updating the software product;
   determining a first subset of the condition-based tree that is able to be evaluated due to available parameters in the first subset of the condition-based tree;
   determining a second subset of the condition-based tree that requires delayed evaluation due to unavailability of parameters in the second subset of the condition-based tree required for evaluating the second subset of the condition-based tree;
   evaluating the first subset of the condition-based tree in a first evaluation phase, to generate a first result of the first evaluation phase;
   after evaluating the first subset of the condition-based tree in the first evaluation phase, receiving the parameters for the second subset of the condition-based tree required for evaluating the second subset of the condition-based tree;
   evaluating the second subset of the condition-based tree utilizing the received parameters in a second evaluation phase, to generate a second result of the second evaluation phase; and
   generating a final evaluation result including a final value of a root of the condition-based tree, utilizing the first result of the first evaluation phase and the second result of the second evaluation phase, for use in updating the software product.

2. The computer program product of claim 1, further comprising computer code for preserving the second subset of the condition-based tree that requires delayed evaluation in a human readable format.

3. The computer program product of claim 2, wherein preserving the second subset of the condition-based tree in the human readable format includes automatically converting the second subset of the condition-based tree from a computer readable format to the human readable format.

4. The computer program product of claim 3, wherein preserving the second subset of the condition-based tree in the human readable format includes storing the second subset of the condition-based tree in the human readable format.

5. The computer program product of claim 4, wherein the stored second subset of the condition-based tree in the human readable format is capable of being edited by a user.

6. The computer program product of claim 5, wherein the parameters are received from a user.

7. The computer program product of claim 1, wherein the condition-based tree is included in a generated software update kit.

8. The computer program product of claim 7, wherein the generated software update kit includes one or more templatized files that represent an end state of the software product.

9. The computer program product of claim 1, wherein the unavailability of the parameters is due to at least a portion of the parameters being missing.

10. The computer program product of claim 1, wherein the unavailability of the parameters is due to at least a portion of the parameters including data that is unreliable.

11. The computer program product of claim 1, further comprising computer code for presenting data corresponding to the second subset of the condition-based tree that requires delayed evaluation.

12. The computer program product of claim 11, wherein presenting the data corresponding to the second subset of the condition-based tree that requires delayed evaluation includes presenting the data in a file.

13. The computer program product of claim 11, wherein presenting the data corresponding to the second subset of the condition-based tree that requires delayed evaluation includes presenting the data in a data tree format.

14. The computer program product of claim 1, wherein the condition-based tree is environment agnostic.

15. The computer program product of claim 14, further comprising computer code for:
creating update material to use for updating the software product, utilizing the final evaluation result, the update material being specific to an environment of a target device to which the update material is to be applied.

16. The computer program product of claim 1, wherein the first evaluation phase is performed on a first device, and the second evaluation phase is performed on a target device on which the software product is to be updated.

17. The computer program product of claim 16, wherein the received parameters are transferred to the target device for performing the second evaluation phase.

18. The computer program product of claim 1, wherein evaluating the first subset of the condition-based tree includes evaluating a first subset of conditions that refer to the available parameters in the first subset of the condition-based tree, and wherein evaluating the second subset of the condition-based tree includes evaluating a second subset of conditions that refer to the parameters received for the second subset of the condition-based tree.

19. A method, comprising:
identifying an update to perform on a software product;
generating a condition-based tree to utilize for updating the software product;
determining a first subset of the condition-based tree that is able to be evaluated due to available parameters in the first subset of the condition-based tree;
determining a second subset of the condition-based tree that requires delayed evaluation due to unavailability of parameters in the second subset of the condition-based tree required for evaluating the second subset of the condition-based tree;
evaluating the first subset of the condition-based tree in a first evaluation phase, to generate a first result of the first evaluation phase;
after evaluating the first subset of the condition-based tree in the first evaluation phase, receiving the parameters for the second subset of the condition-based tree required for evaluating the second subset of the condition-based tree;
evaluating the second subset of the condition-based tree utilizing the received parameters in a second evaluation phase, to generate a second result of the second evaluation phase; and
generating a final evaluation result including a final value of a root of the condition-based tree, utilizing the first result of the first evaluation phase and the second result of the second evaluation phase, for use in updating the software product.

20. A system, comprising:
one or more hardware processors for:
identifying an update to perform on a software product;
generating a condition-based tree to utilize for updating the software product;
determining a first subset of the condition-based tree that is able to be evaluated due to available parameters in the first subset of the condition-based tree;
determining a second subset of the condition-based tree that requires delayed evaluation due to unavailability of parameters in the second subset of the condition-based tree required for evaluating the second subset of the condition-based tree;
evaluating the first subset of the condition-based tree in a first evaluation phase, to generate a first result of the first evaluation phase;
after evaluating the first subset of the condition-based tree in the first evaluation phase, receiving the parameters for the second subset of the condition-based tree required for evaluating the second subset of the condition-based tree;
evaluating the second subset of the condition-based tree utilizing the received parameters in a second evaluation phase, to generate a second result of the second evaluation phase; and
generating a final evaluation result including a final value of a root of the condition-based tree, utilizing the first result of the first evaluation phase and the second result of the second evaluation phase, for use in updating the software product.

* * * * *